United States Patent Office 2,696,501
Patented Dec. 7, 1954

2,696,501

PROCESS OF MANUFACTURING ALKALI SALTS OF SEBACIC ACID

Werner Stein, Dusseldorf-Holthausen, Germany, assignor to Henkel & Cie., G. m. b. H., Dusseldorf-Holthausen, Germany, a German company No Drawing. Application December 6, 1951, Serial No. 260,317

Claims priority, application Germany December 14, 1950

9 Claims. (Cl. 260—537)

This invention relates to a process of manufacturing alkali salts of sebacic acid.

Prior art methods of manufacturing salts of sebacic acid by splitting castor oil, results in yields amounting to 70% to 85% of theoretical value. The time of reaction of these methods required many hours.

If the reaction is performed in absence of water and in the presence of a large excess of alkali, amounting to as much as four times that required by theoretical calculations, lower yields are obtained than when water is used in the reaction. However, even under the best possible conditions of reaction, resulting in yields of about 85% of theory, it was necessary to heat for 10 hours at a temperature of 275° C.

An object of the present invention is to overcome the drawbacks of prior art methods in that the herein described novel method would require but a fraction of the time required by the prior art method and/or would, moreover, require but a fraction of the high temperature previously used.

Other objects of this invention will become apparent in the course of the following specification.

In attaining the objects of the present invention it was found that the reaction can be greatly accelerated if it is carried out in the presence of cadmium or cadmium containing substances. By the use of cadmium it was found the reaction temperature or the reaction time or both can be considerably reduced.

At the present time castor oil or the castor oil acid produced therefrom are of the greatest importance as basic source material of the process of this invention. When castor oil is used it is necessary to add to the reaction the amount of water consumed in the reaction. However, when the acid of castor oil is used, water is produced as a result of the neutralization of the free acid of castor oil by caustic alkali.

Throughout the specification and claims the expression "in the substantial absence of water" is used to indicate operations wherein this minimum of water, being theoretical necessary for the reaction, is used.

Of the caustic alkalis, the most suitable for the purposes of this invention are caustic soda and also, in some cases, caustic potash.

It was found that when cadmium in metallic or chemically bound form is added in any manner to the reaction, it will be deposited in the course of time in the form of a cadmium coating upon the walls of vats or autoclaves, so that a further addition of cadmium is not necessary. It is possible, in fact, to employ vats or autoclaves which have been coated in advance with a layer of cadmium.

It was further found that formation of salts of sebacic acid begins at about 200° C. In a practical manufacturing process, however, it is necessary to employ temperatures above 235° C., which may be increased to above 350° C., particularly when the danger of decomposition at high temperatures is diminished by the addition of water.

The following procedures are described by way of example only.

It is rather difficult to melt alkali salts of sebacic acid, so that difficulties may arise in the course of the reaction or when operating with the reaction mixture, for example, when emptying vessels used in the reaction. This difficulty is diminished by adding water to the reactants.

Under these circumstances it is necessary to prevent a sudden drop in pressure when discharging the hydrogen produced during the reaction, this discharge taking place continuously or intermittently during the reaction or after its completion, since this drop could cause a boiling and foaming of the product which may result in a loss of the desired material and in a clogging of the apparatus. This boiling of the reaction mixture can be avoided by maintaining in the apparatus a pressure which is higher than the vapor pressure of the water therein.

The process in accordance with the present invention results in a mixture of alkali salts of sebacic acid and of monobasic aliphatic acids which corresponds primarily to the fatty acids contained in the castor oil and which are not transformed into di-carboxylic acids. This mixture is in itself of practical industrial importance, but is primarily of interest after being transformed into free acids as a result of further treatment. The monobasic fatty acids may be separated by fractional precipitation with acids. By way of example the mixture of alkali salts can be transformed by means of suitable substances into esters which are suitable as softeners provided that the conversion component to ester formation is suitable chosen. Furthermore by a partial or total acidification it is possible to obtain alkali sebacates and then free sebacic acid.

For this purpose the reaction product, when necessary, is dissolved in water or diluted therewith. If the sebacic acid remaining in solution after precipitation of the initially separated monobasic acids is then acidified in the heat, a crystalline product is obtained after cooling which is easily capable of filtration.

It is possible, however, to produce sebacic acid or its salts by other means from the reaction product, for example, by fractional extraction with organic solvents.

The process of the present invention, which involves reactions in the presence of metallic cadmium or cadmium compounds has the important advantage of increasing the speed of reaction. As already stated, this makes it possible to utilize much more effectively the space occupied by the apparatus, or by operating with lower temperatures to increase the safety of the process to a considerable extent.

In accordance with a preferred embodiment of the inventive idea the reactants are heated for a while to the reaction temperature in an autoclave of V4A steel, provided with stirrers. Cadmium compounds were used in conjunction with copper charge or insert, which in the course of time received a cadmium coating. After the reaction was completed, the pressure was released and the contents of the autoclave were dissolved in or diluted with water. After the solution was acidified with sulphuric acid to pH 6, steam was used to drive off the octanol formed during the course of the reaction, as well as any octanone which may have been produced. After separating out the monobasic fatty acids, the sebacic acid contained in solution can be separated in a form capable of filtration by further acidifying the heated solution and then allowing it to cool.

The following examples are given solely by way of exemplification and not by way of limitation; these examples give the composition of the reaction mass, the reaction conditions and the amount of end products obtained after the acidification. The yields given in per cent of theory, are calculated on the base of the real content of ricinolic acid in the castor oil.

Example 1

Reactants were 468 gr. castor oil, 237 gr. NaOH, 237 gr. water, and 14 gr. CdO.

An autoclave with a copper lining was used.
Reaction: 1 hour at 275° C.
Yield:
    229 gr. sebacic acid=49% of the castor oil=84% of theory
    90 gr. octanol=19% of the castor oil
    90 gr. fatty acids=19% of the castor oil Where the same reaction conditions prevailed but in the absence of cadmium and where a V4A autoclave without a copper coating is used, the following result was obtained:

168 gr. sebacic acid=36% of the castor oil=61% of theory
97 gr. octanol=21% of the castor oil
182 gr. fatty acids=39% of the castor oil

*Example 2*

In this example the reactants were 468 gr. castor oil, 160 gr. NaOH, 27 gr. water, 14 gr. CdO.
An autoclave with a copper lining was used.
Reaction: 5 hours at 300° C.
Yield:
  238 gr. sebacic acid=51% of the castor oil=88% of theory.
  82 gr. octanol=17% of the castor oil
  150 gr. fatty acids=32% of the castor oil Where the same reaction conditions prevail as in Example 2, but in the absence of cadmium and where a V4A autoclave without copper coating is used, the following result is obtained:

117 gr. sebacic acid=25% of the castor oil=43% of theory
70 gr. octanol=15% of the castor oil
194 gr. fatty acids=32% of the castor oil

*Example 3*

Reactants were 468 gr. castor oil, 237 gr. NaOH, 237 gr. water
The autoclave was the same, that was used in the foregoing examples. The copper lining had been coated with a layer of cadmium. Therefore, no cadmium was added to the charge.
Reaction: 2 hours at 275° C.
Yield:
  225 gr. sebacic acid=48% of the castor oil=82% of theory
  94 gr. octanol=20% of the castor oil
  98 gr. fatty acids=22% of the castor oil

*Example 4*

Reactants were 468 gr. castor oil, 160 gr. NaOH, 27 gr. water.
There was used a vessel with a copper lining, that had been coated with a cadmium layer by galvanic treatment.
Reaction: 5 hours at 300° C.
Yield: 230 gr. sebacic acid=49% of the castor oil=84% of theory

*Example 5*

Reactants were 600 gr. fatty acids from castor oil, 210 gr. caustic soda and 18 gr. CdO. The caustic soda had a NaOH-content of 90%, the rest was water and some sodium carbonate.
An autoclave with a copper lining was used.
Reaction: 5 hours at 280° C.
Yield: 285 gr. sebacic acid=84% of theory

*Example 6*

Reactants were 600 gr. fatty acids from castor oil, 320 gr. NaOH, 320 gr. water and 18 gr. Cd on kieselguhr as carrier.
The copper lining of the autoclave was coated by cadmium from the foregoing runs.
Reaction: 2 hours at 280° C.
Yield: 304 gr. sebacic acid=88% of theory

What is claimed is:
1. The process of manufacturing alkali salts of sebacic acid, which comprises treating castor oil with caustic alkali at high temperatures in the presence of cadmium.
2. The process of claim 1 wherein castor oil acids are used in lieu of castor oil.
3. The process of claim 1 wherein castor oil acid soaps are used in lieu of castor oil.
4. The process of claim 1 wherein cadmium is used in the form of a cadmium compound.
5. The process of claim 1, wherein the treatment takes place in the presence of water.
6. The process of claim 5, wherein the cadmium is in the form of a cadmium compound.
7. The process of producing alkali salts of sebacic acid comprising reacting castor oil, water and caustic alkali in the presence of metallic cadmium and at a temperature of about 235° C. to about 350° C.
8. The process of claim 1, wherein the cadmium is used in presence of a carrier for the cadmium.
9. The process of claim 1, wherein the cadmium is used in the form of a cadmium coating of the autoclave.

References Cited in the file of this patent

UNITED STATES PATENTS

| Number | Name | Date |
|---|---|---|
| 1,926,068 | Strosocker | Sept. 12, 1933 |
| 2,182,056 | Brison et al. | Dec. 5, 1939 |
| 2,217,515 | Houpt | Oct. 8, 1940 |
| 2,217,516 | Houpt | Oct. 8, 1940 |
| 2,304,602 | Schrauth et al. | Dec. 8, 1942 |
| 2,318,762 | Davis et al. | May 11, 1943 |
| 2,384,817 | Chitwood | Sept. 18, 1945 |
| 2,580,931 | Lane | Jan. 1, 1952 |